June 16, 1925.

F. ARMBRUST

ATTACHMENT FOR PLUMBERS' POTS

Filed Jan. 25, 1924

1,542,653

WITNESSES

INVENTOR
FERDINAND ARMBRUST.
BY
ATTORNEYS

Patented June 16, 1925.

1,542,653

UNITED STATES PATENT OFFICE.

FERDINAND ARMBRUST, OF JAMESTOWN, RHODE ISLAND.

ATTACHMENT FOR PLUMBERS' POTS.

Application filed January 25, 1924. Serial No. 688,545.

*To all whom it may concern:*

Be it known that I, FERDINAND ARMBRUST, a citizen of the United States, and a resident of Jamestown, in the county of Newport and State of Rhode Island, have invented a new and Improved Attachment for Plumbers' Pots, of which the following is a full, clear, and exact description.

The invention relates to a simple and efficient attachment for plumbers' pots, and has for an object the provision of an attachment in the form of a baffle member which can be disposed over a plumber's pot to deflect a proper proportion of the heat to which the outside of the pot is subjected downward on the metal within the pot so that it will become hot in a relatively short length of time.

Another object concerns the provision of an attachment which is very simply constructed and can be manufactured at a very small cost and yet which is adapted for efficient use on many types of pots.

The invention is shown in the drawings, of which —

Figure 1:
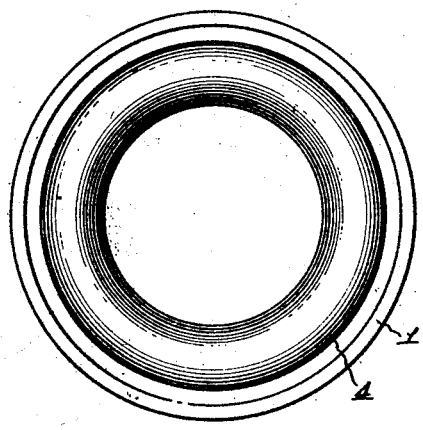
Figure 1 is a plan view of the device with the baffle member in place.
Figure 2:
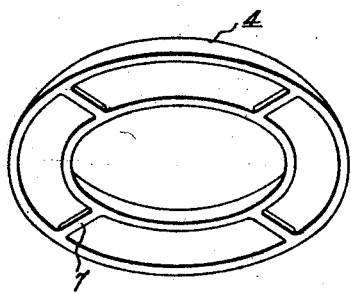
Fig. 2 is a perspective view of the baffle member.
Figure 3:
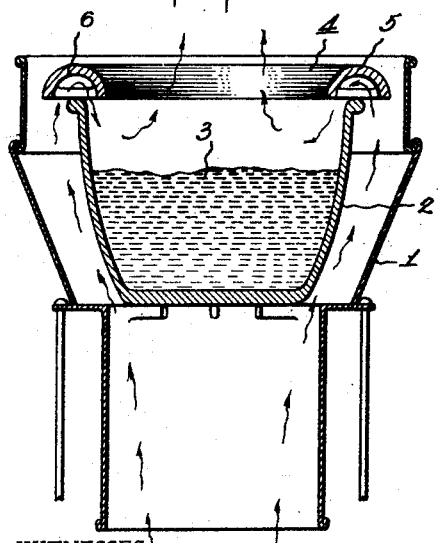
Fig. 3 is a vertical section through the pot showing the baffle member in place.

As shown in the drawings, the attachment is adapted to be applied to any suitable device, such as a plumber's furnace, 1 within which a metal-containing pot 2 is disposed. This pot is adapted to contain any suitable material, such as solder, 3 which is to be melted by subjecting the outside and the bottom of the pot to a flame of any suitable type. As is customary in the use of these pots, the flame is fed under pressure and passes up against the bottom of the pot and up along the sides. It is obvious that in the usual construction a considerable portion of this heat is wasted passing upward out of the furnace. To avoid this waste and utilize the heat more effectively on the metal, I dispose a baffle member 4 on the top edge of the pot, being so constructed that it extends partly over the outside edge of the pot and partly over the inside edge. This member is curved so that part of the heat strikes the valve and is deflected downwardly on the metal within the pot. The preferred form of the member 4 is that of a circular curved plate, somewhat in appearance like a half portion of a doughnut cut longitudinally in half, thus providing an upper surface 5 which is convex and an inner surface 6 which is concave. This baffle member or ring 4 is provided with suitable bars such as 7 throughout its length on the underside to permit it to rest on the edge of the pot and maintain the concave surface spaced above the edge to receive the heat and by reason of its curvature to be deflected downwardly, as indicated by the arrow in Fig. 3.

Figure 4:
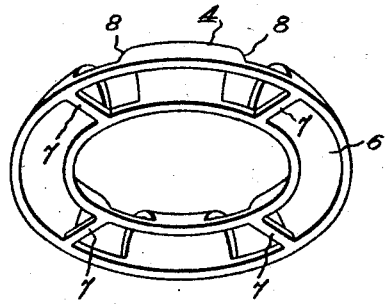
Fig. 4 is a perspective view of a modified form of baffle member.

As shown in Fig. 4, a similar ring is provided and is modified by cutting through a plurality of openings such as 8 throughout the length of the member to permit a certain portion of the heat to escape upwardly as desired. This ring, of course, can be made of any suitable material, which is preferably cast iron, and can be made any desired size to be readily disposed on the top of any sized pot.

What I claim is:—

1. An attachment for plumbers' pots, which includes a baffle ring adapted to be disposed on the top edge of a pot and having its lower surface concave to deflect the heat to which the pot is subjected downwardly on the metal within the pot, the outer edge of the said ring extending over the outer edge of the pot, and the inner edge of said ring extending over the inner edge of the pot.

2. An attachment for plumbers' pots, which includes a baffle ring adapted to be disposed on the top edge of a pot and having its lower surface concave to deflect the heat to which the pot is subjected downwardly on the metal within the pot, the outer edge of the said ring extending over the outer edge of the pot and the inner edge of said ring extending over the inner edge of the pot, and a plurality of bars disposed across the lower face of the ring to permit it to be supported on the edge of the pot.

3. An attachment for plumbers' pots, which includes a baffle ring adapted to be disposed on the top edge of a pot and having its lower surface concave to deflect the heat to which the pot is subjected downwardly on the metal within the pot, the outer edge of the said ring extending over the outer edge of the pot and the inner edge of said ring extending over the inner edge of the pot, and a plurality of bars disposed across the lower face of the ring to permit it to be supported on the edge of the pot, said ring having throughout its length a plurality of apertures cut through to permit a portion of the heat to escape upwardly.

FERDINAND ARMBRUST.